Dec. 15, 1936. E. W. SHACKFORD ET AL 2,064,498
SLEET AND MIST ELIMINATING DEVICE FOR WINDSHIELDS
Filed Jan. 31, 1935
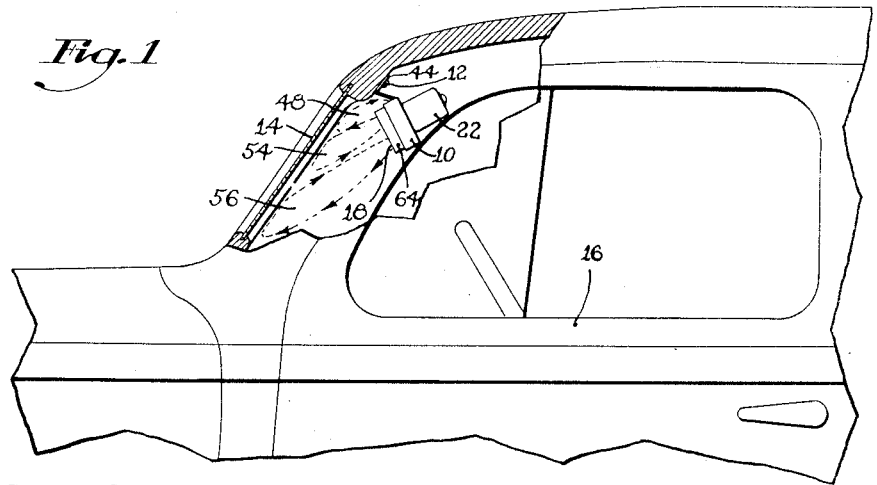
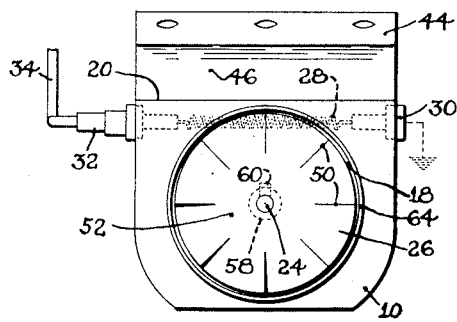
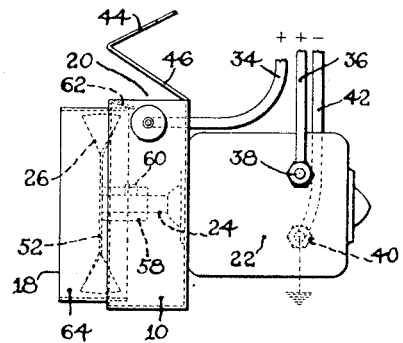
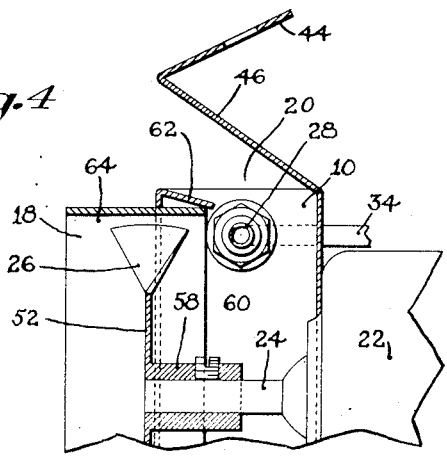
Witness
H. E. Van Dine
Inventors
Earl W. Shackford
Alfred W. Ingalls
by Fish Hildreth
Cary & Jenney Attys.

Patented Dec. 15, 1936

2,064,498

UNITED STATES PATENT OFFICE 2,064,498

SLEET AND MIST ELIMINATING DEVICE FOR WINDSHIELDS

Earl W. Shackford, Cambridge, and Alfred W. Ingalls, Lynn, Mass.

Application January 31, 1935, Serial No. 4,416

2 Claims. (Cl. 20—40.5)

The present invention relates to sleet and mist eliminating devices for windshields.

It is common practice to mount some sort of air circulating or heating device on a windshield of an automobile, or similar vehicle, to prevent collection of sleet and mist on the windshield surfaces. Due to the low voltage and small capacity of electrical systems in an automobile, relatively small heating power is available from this source. An electrical heating element for use with low voltages, as on the order of six volts, will necessarily act effectively only over a small area and will require considerable current from the supply system to produce the desired results. When such an element is placed in close proximity to the surface of a glass windshield and sufficient heat is applied to successfully prevent formation of ice and mist, the glass is frequently broken due to long-continued uneven heating over a restricted area with abrupt extremes of temperature between adjacent sections of the windshield. If such a heater is combined with a fan or blower, the amount of heat available is usually ineffective in producing practical results on account of the relatively large volume of air circulated for the heat available.

It is the object of the present invention to provide a simple, compact and efficient electrically operated sleet and mist eliminator which will distribute a small concentrated supply of heat, such as produced by a low voltage electrically heated coil over a sufficient portion of the vision area in a windshield without overtaxing the current supply system of the automobile in which the eliminator is employed.

In accordance with this and other objects, a feature of the present invention contemplates the provision in a windshield sleet eliminator having a heated casing, of a fan arranged in the outlet of the casing so as to create a turbulent mixture of heated air in proximity to the vision area of the windshield without spreading the heated air supply unnecessarily to other parts of the automobile.

In the form of the invention illustrated, the heated air is continuously recirculated by the fan in the casing so that a substantial portion of the heat produced by an electrical heating unit within the fan casing may be distributed over a much greater area of the windshield and the temperature of the air directed against the windshield glass will have an average higher temperature than would otherwise be possible.

These and other features of the invention will be apparent from the following specification, claims and accompanying drawing, in which Fig. 1 illustrates a portion of an automobile body and windshield in section, with a sleet eliminator embodying the present invention secured thereto; Fig. 2 is a front view on an enlarged scale of the sleet eliminator; Fig. 3 is a view in side elevation of the eliminator, looking from the right; and Fig. 4 is a view, partly in section, of a portion of the eliminator, looking from the right side.

Referring to the drawing, the apparatus illustrated comprises a casing 10 secured by means of screws 12 to the frame portion of a windshield 14 mounted in an automobile body 16. The casing 10 is constructed with a circular outlet 18 and an elongated rectangular inlet 20 opening upwardly at right angles to the opening of the outlet 18. At the rear of the casing 10 there is mounted an electric motor 22 having a central shaft 24 entering the casing 10 and carrying at its forward end a fan 26. In lengthwise relation across the inlet opening 20 is arranged a short electrically heated coil 28 grounded at one end 30 to the casing 10 and connected at the other end to an insulated terminal 32 at the other side of the casing. The coil 28 is heated by an electric current derived from the usual six-volt supply battery of the automobile through a connecting wire 34 to the terminal 32. The motor 22 is similarly supplied with power through a connection 36 to the motor terminal 38, the opposite terminal 40 of the motor being grounded, as by connection wire 42. When the circuits to the heating coil 28 and motor 22 are completed, as by means of a suitable switch (not shown), the fan 26 is rotated to direct heated air downwardly against the inner surface of the windshield.

According to the present invention, the fan 26 is arranged to rotate directly in the outlet opening 18 of the casing 10 so that air drawn past the restricted surfaces of the heating coil will be carried in a rotating divergent stream against the vision area of the windshield. By so arranging the fan, it acts not only to produce circulation of the air through the casing, but also to provide a more uniform temperature distribution in the windshield glass by reason of the turbulent mixture of non-uniformly heated air provided by the small high temperature heating coil.

To assist in conserving the heat and to increase the temperature of the air directed against the windshield, a considerable portion of the air deflected from the windshield is directly recirculated by the fan and kept within the area adjacent the outlet of the casing 10. The casing 10 is supported on the windshield frame by a bracket 44 through which the screws 12 pass. A part of the bracket 44 is in the form of an apron 46 extending in a substantially horizontal direction between the windshield and the inlet opening 20 of the casing 10, so that heated air rising from between the outlet 18 and the windshield 14 will be drawn by suction through the inlet 20, completing the recirculating path of air indicated by the dotted circuit 48.

Another feature of the invention which further assists in increasing the effectiveness on the windshield of the heated air resides in the fan construction. The fan 26 is made from a substantially circular disk with radially cuts 50 extending part-way to its central axis. A substantial area 52 at the center of the fan is left uncut and the fan blades formed by the cuts 50 are given the proper pitch to produce a hollow cylindrical stream of air diverging outwardly from the outlet 18. The uncut area 52 of the fan being imperforate, reduces the amount of air discharged from the casing past the fan and the stream of heated air at the outer circumference of the fan induces an inwardly directed draft of air towards the center of the fan. As soon as the air reaches the uncut portion 52 of the fan, it is sucked back into the outwardly directed heated air stream forming additional recirculating air paths indicated by the dotted circuits 54 and 56.

The fan 26 is fixed to a central hub 58 removably secured on the motor shaft 24 by a set screw 60, the set screw being accessible through the inlet opening 20 of the casing 10. The lower edge of the inlet opening carries a flange 62 extending upwardly towards the heating coil 28 to prevent incoming air from passing beneath the heated coil, where the heating effect of the coil is less effective. With the flange 62, the coil may be spaced properly from the front and rear side of the casing 10 to reduce the heating effect on the casing itself, so that higher temperatures may be imparted to the circulating air. To increase the efficiency of the fan and prevent escape of the heated air radially of the fan, a cylindrical rim 64 is secured in the outlet opening 18 surrounding the fan.

Having thus explained the nature and objects of the invention, and having specifically described a machine embodying the same in its preferred form, what is claimed is:

1. Apparatus for providing a clear view area on a windshield comprising a heated casing having an inlet and an outlet above the area to be cleared, a rotary fan disposed in the outlet of the casing to direct a heated mixture of air against the windshield, and an apron extending between the inlet of the casing and the top of the windshield for causing the heated air deflected from the windshield to be recirculated through the casing.

2. Apparatus for providing a clear view area on a windshield comprising a heated casing having an inlet and an outlet above the area to be cleared, a rotary fan disposed in the outlet of the casing to direct a heated mixture of air against the windshield, and a supporting bracket for said casing on the windshield including an apron extending between the inlet and the windshield above the area to be cleared for causing the heated air deflected from the windshield to be recirculated through the casing.

EARL W. SHACKFORD.
ALFRED W. INGALLS.